Nov. 28, 1939.  A. J. HAYDEN  2,181,551
ANIMAL TRAP
Filed May 21, 1938  2 Sheets-Sheet 1
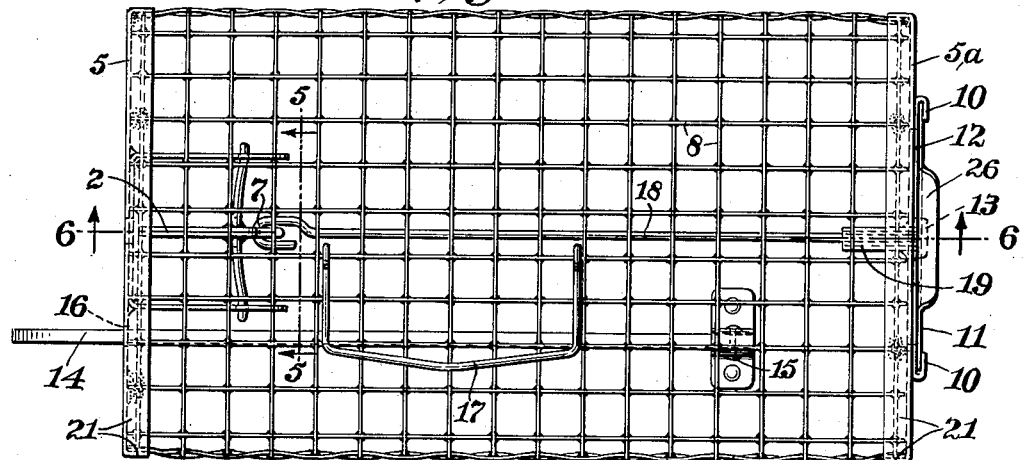
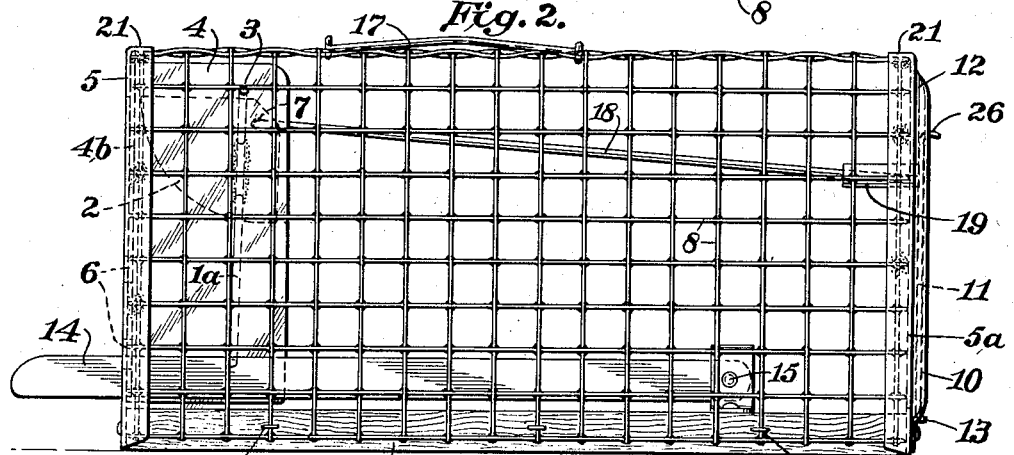
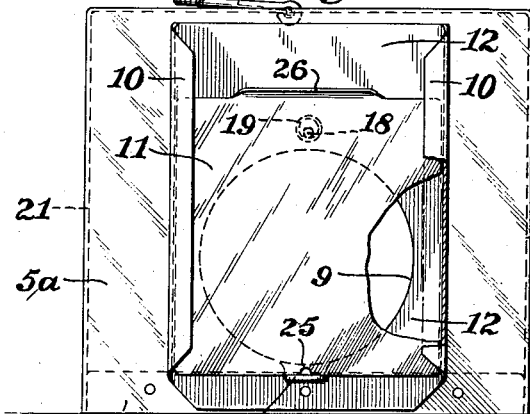
Inventor:
Alfred J. Hayden,
By Spear, Donaldson & Hall
Attorneys.

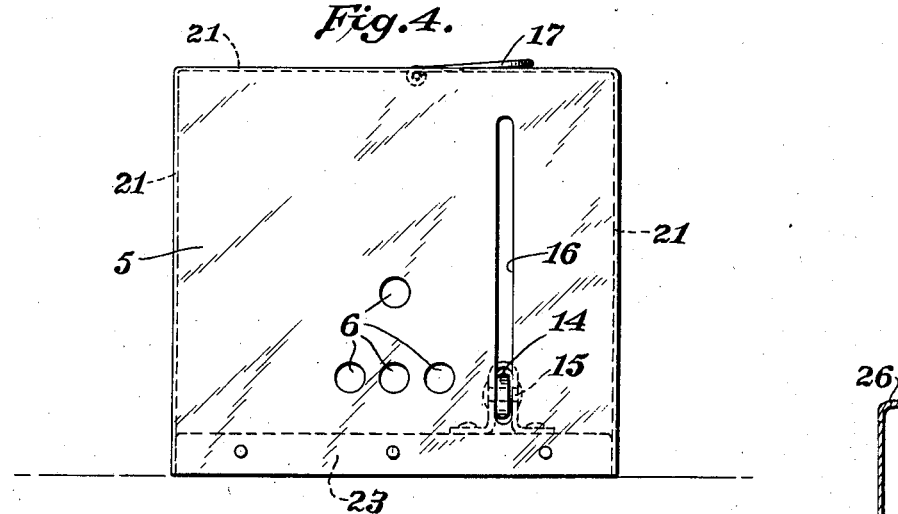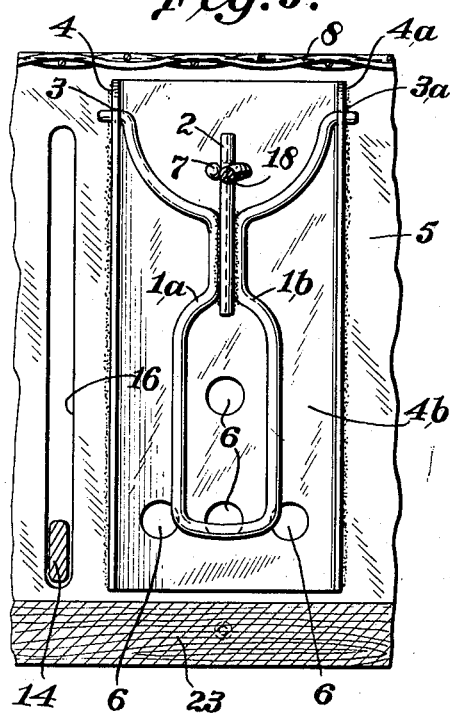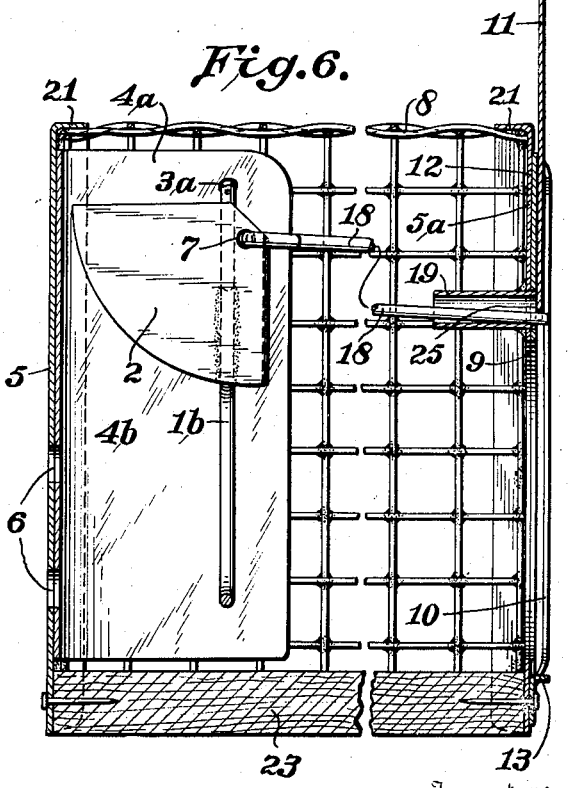

Patented Nov. 28, 1939

2,181,551

UNITED STATES PATENT OFFICE 2,181,551

ANIMAL TRAP

Alfred J. Hayden, Port Orange, Fla.

Application May 21, 1938, Serial No. 209,351

11 Claims. (Cl. 43—61)

The invention relates to animal traps, and more particularly to traps for catching rodents, such as rats, or other small animals.

An object of the invention is to provide an efficient trap of simple and economical construction which will be effective in operation, and which can be readily handled without contact with the animal in a clean and sanitary manner.

Another object is to provide a trap wherein trigger means is provided which is releasable by the animal in seeking to reach the bait.

Another object is to provide means for effectively and mercifully killing the rat, or other animal, while in the trap, and removing the same from the trap, which is then ready for re-use without necessity of contact with the animal, nor with the interior of the trap in baiting and preparing it for re-use.

Other objects will appear hereinafter.

The invention consists in the features, combination, and arrangement of parts herein described, and as particularly pointed out in the claims.

With reference to the accompanying drawings

Figure 1 is a plan view of a trap embodying my invention.

Fig. 2 is a side view of the same.

Figs. 3 and 4 are end views.

Fig. 5 is an enlarged cross section substantially on the line 5—5 of Fig. 1.

Fig. 6 is an enlarged fragmentary cross section substantially on the line 6—6 of Figure 1.

Referring to the drawings, 1 represents the trigger member desirably substantially in the form of a loop having arms 1a and 1b secured to opposite sides of a plate 2 disposed substantially at right angles to the plane of the loop, and extending away therefrom to provide weighting or counterbalancing means. The arms 1a and 1b of the loop trigger are extended laterally and are pivotally disposed in openings 3 and 3a, in walls 4 and 4a extending inwardly from an end wall 5 of the animal trap, and forming a bait chamber, the bait being admitted through an opening, or openings, 6 in the end wall. The bait chamber desirably may be formed by a piece of sheet metal bent in U-shape to provide the walls 4 and 4a, and with the connecting wall 4b of the U-shaped member soldered, or otherwise secured to the end wall of the trap.

The loop trigger is of such form as to effectively obstruct the entrance to the bait chamber from the main chamber of the trap against the passage of the animal, or access of the animal, to the bait in the bait chamber, except by moving the loop trigger about its pivots, which are disposed in the upper end of the walls of the bait chamber. A longitudinally extending rod 18 is desirably pivotally secured to the front end of the plate of said loop trigger, as indicated at 7, the rod extending forwardly of the trap and through a ferrule 19 mounted in the front end wall thereof. The front end wall 5a as well as the rear end wall 5 are desirably formed of sheet metal with overturned edges forming flanges 21 receiving the edges of a piece of wire mesh 8 bent into U-shape and forming the side and top walls of the trap.

The bottom 23 of the trap is desirably of wood, and the end walls and wire mesh may be secured to the edges of the wood bottom by suitable fastening means, such as nails or staples, or the like 24.

The front end wall of the trap provides an entrance opening 9 which may be in the form of a round hole. Guideways 10 are provided in the front end wall of the trap for slidably receiving a door or slide 11. These guideways may desirably be formed by a plate 12 overlying the end wall which may be of sheet metal, and having overturned side edges providing the grooves 10. This plate 12 may be secured to the sheet metal of the end wall as by soldering.

A lower stop for the door may be formed by a lip 13 turned down from the overlying plate at the bottom of the entrance opening therein which registers with the corresponding entrance opening in the end wall to form, in effect, one entrance opening. The longitudinal rod normally tends to extend through the ferrule and beyond the front face of the end wall, or its overlying plate, and when the door is in open or raised position, the rod will slide thereunder under action of the counterbalancing plate on the loop trigger, and will support the door in open position. When, however, the trigger is actuated as by the animal attempting to reach the bait, the longitudinal rod will be withdrawn, permitting the door to drop down, and close the entrance opening in the front wall of the trap. The rod will then bear against the inner face of the door until the door is raised to open position, whereupon it will again move forwardly under the door to support the same. Desirably the door may be provided with a small notch 25 in its lower end to rest upon the end of the longitudinal rod, and the door may be provided with an overturned lip or flange 26 providing a handle means for raising the same.

The invention also embodies a lever device for killing the animal in the form of a bar or lever 14 which may be desirably pivotally secured to the floor or bottom of the trap adjacent the forward end of the trap, as shown at 15, and extending rearwardly through a vertically disposed elongated slot 16 in the rear end wall, the bar being of such length and the slot of such extent that the rat, or other animal, may be received thereunder for quickly and mercifully killing the same.

A suitable handle may be provided at 17 having overturned or looped ends engaging the wire mesh forming the top of the trap.

It will thus be seen that an efficient trap is provided which will effectively capture and dispatch rats, and which may be handled and prepared for re-use with fresh bait without the necessity for contact with the animal, or with the interior of the trap, by the operator.

I claim:

1. In combination an animal trap, a housing providing a main chamber and a bait chamber at one end of the main chamber with a communicating opening between said chambers, a trigger member vertically disposed in said communicating opening and pivotally mounted at its upper end for swinging movement relative to said chambers, a door in said housing at the opposite end of the main chamber, and a rod for controlling said door, said rod being secured to said trigger, said trigger being of a form to completely obstruct the said communicating opening against passage of the animal or access of the animal to the bait chamber except by moving the trigger.

2. An animal trap according to claim 1 in which said housing has end walls, and said bait chamber is formed by a pair of walls extending inwardly from an end wall of the housing, said trigger member being pivotally mounted in the upper ends of said pair of walls.

3. An animal trap according to claim 1 in which said housing has end walls, and said bait chamber is formed by a pair of walls extending inwardly from an end wall of the housing, said bait chamber being of less width than said housing providing a space in said main chamber on either side of said bait chamber.

4. An animal trap according to claim 1 in which said trigger is substantially in the form of a loop of wire or the like transversely disposed across said communicating opening, and preventing access of the animal to the bait chamber, except by moving the trigger, said trigger also including a plate member to which arms of the loop of wire are secured on either side of the plate, said arms being extended to form projections from either side of the plate to serve as pivots for supporting the trigger, said plate being disposed substantially at right angles to the plane of the loop of wire and being extended into said bait chamber to provide weighting means urging said trigger and the rod secured thereto toward the door.

5. An animal trap according to claim 1 in which said housing has end walls, and said bait chamber is formed by a pair of walls extending inwardly from an end wall of the housing, said trigger member being pivotally mounted in the upper ends of said pair of walls, said trigger member comprising substantially a loop of wire, and a plate disposed substantially at right angles to the plane of the loop of wire, the arms of said wire being secured to the opposite sides of said plate, the ends of the arms being extended and turned laterally outwardly and pivotally received in holes in said walls of the bait chamber.

6. In an animal trap, a housing providing a bottom and side, top, and end walls, and a lever pivotally mounted on the bottom and extending through a vertical slot in one of said walls, said lever extending for sufficient length within said trap, and said slot being of sufficient length, to allow for an animal being caught beneath the lever while in the trap.

7. An animal trap according to claim 1 including a wood bottom having sheet metal end walls secured to said wood bottom, and side and top walls formed of wire mesh received within overlying flanges of the metal end walls and secured thereto and secured to the sides of the wood bottom.

8. In an animal trap, an end wall of sheet metal having an entrance opening therein, and means thereon providing spaced apart grooves, a door of sheet metal slidably received in said grooves, said means also having a door stop member thereon for determining the closed position of said door, and an opening in said end wall above said entrance opening, a ferrule disposed in said opening, a rod slidably received in said ferrule, said door being adapted to be held in open elevated position by said rod disposed in said ferrule, and being adapted to close by gravity upon withdrawal of said rod into said ferrule, and means to actuate said rod comprising a trigger member to be engaged by the animal.

9. In an animal trap according to claim 8, said grooves being formed by a separate sheet metal plate overlying the said end wall and secured thereto and having an entrance opening registering with the entrance opening in the end wall, the longitudinal side edges of said overlying plate being turned over to provide the grooves for receiving the door, a lip or flange being turned over from the sheet metal plate at the lower portion of the entrance opening therein to provide the door stop, and said ferrule being secured to and extending through said end wall and said overlying plate and substantially flush with the outer surface of said overlying plate.

10. An animal trap according to claim 1 in which said housing has end walls, and said bait chamber is formed by a pair of walls extending inwardly from an end wall of the housing, said trigger member being supported by the upper ends of said pair of walls, said trigger member comprising substantially a loop of wire, and a plate disposed substantially at right angles to the plane of the loop of wire, the arms of said wire being secured to the opposite sides of said plate, the ends of the arms being extended and turned laterally outwardly and pivotally received in holes in said walls of the bait chamber, said rod being pivotally secured in the upper end of said plate and extending forwardly, a ferrule mounted in the opposite end wall of the housing said rod extending into said ferrule and into engagement with said door slidably mounted on said end wall, said rod bearing against said slidable door and being adapted to move under the door to support the same in elevated position, and to withdraw to permit the door to fall upon withdrawal of the rod by actuation of the trigger.

11. An animal trap according to claim 1 in which said housing has end walls, and said bait chamber is formed by a U-shaped piece of sheet metal, the base of said U-shaped piece of sheet metal being secured to the end wall of the trap and the side portions of said U-shaped piece of sheet metal providing a pair of inwardly extending walls, said trigger member being pivotally mounted in the upper ends of said pair of walls, said trigger member comprising substantially a loop of wire and a plate disposed substantially at right angles to the plane of the loop of wire, the arms of said wire being secured to the opposite sides of said plate, the ends of the arms being extended and turned laterally outwardly and pivotally received in holes in said pair of walls of the bait chamber.

ALFRED J. HAYDEN.